UNITED STATES PATENT OFFICE.

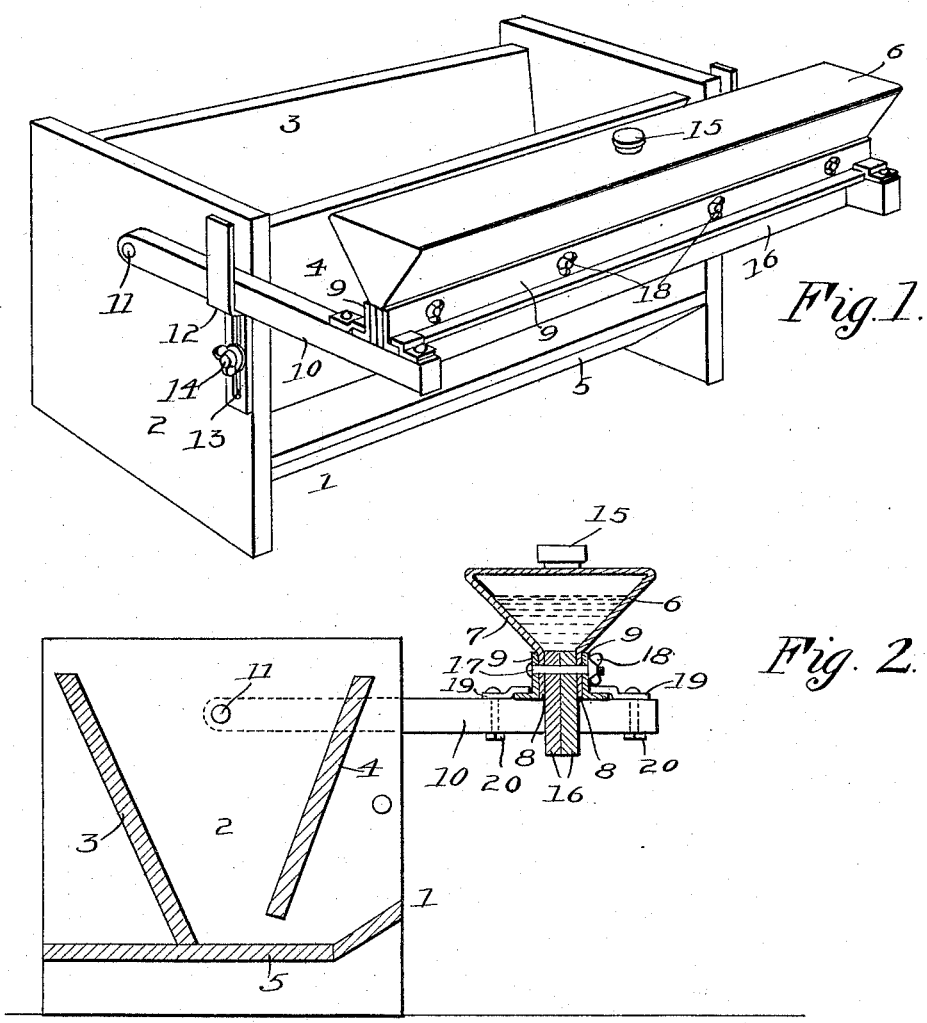

HERMAN J. SCHIPPER, OF ROANN, INDIANA.

HOG-OILER.

1,302,979.   Specification of Letters Patent.   Patented May 6, 1919.

Application filed July 24, 1918. Serial No. 246,502.

*To all whom it may concern:*

Be it known that I, HERMAN J. SCHIPPER, a citizen of the United States, residing at Roann, in the county of Wabash and State of Indiana, have invented new and useful Improvements in Hog-Oilers, of which the following is a specification.

This invention is an improved device adapted to be attached to a feeding trough and used in connection therewith for applying oil or other medicament to the backs of hogs as the animals feed from the trough, the object of the invention being to provide an improved oiler of this kind which is simple in construction, which is vertically movable so as to adjust itself to animals of various sizes and which is provided with means for regulating the flow of oil therefrom.

With the above and other objects in view, the invention consists in the construction, combination and arrangement of devices hereinafter described and claimed.

In the accompanying drawings:—

Figure 1 is a perspective view of a hog feeding trough or self feeder provided with an oiler constructed and arranged in accordance with my invention.

Fig. 2 is a transverse sectional view of the same.

The feed trough or self feeder 1 is of the usual construction, comprising end walls 2, an inclined rear wall 3, an oppositely inclined front wall 4 and a bottom or trough 5 which is supplied with feed by the front and rear walls.

In accordance with my invention, I provide an oiler 6 which is here shown as having downwardly converging side walls 7 which have vertical lower portions 8. The oiler has its portions 8 arranged between a pair of angle bars 9, the ends of which are supported on arms 10 which arms are pivotally mounted at their inner ends as at 11 on the end walls of the feed trough. Brackets 12 support the arms 10 and permit said arms and, hence, the oiler, to be arranged at any desired vertical adjustment, the brackets being provided with vertical slots 13 and being secured on the end walls 2 of the feed trough by set screws 14 which pass through said slots.

The oiler is provided in the top with a filling nipple indicated at 15 and is provided in the bottom with strips 16 of burlap or other suitable absorbent material and which are arranged and compressed between the vertical portions 8 of the walls 7 and become saturated with the oil. Bolts 17 pass through the angle bars 9, the wall portions 8 and the burlap strips, and are provided with winged adjusting nuts 18 and enable the burlap strips to be put under any desired degree of compression in order to regulate the flow or seepage of oil therethrough.

Clips 19 are secured on the outer portions of the arms 10 by means of bolts 20 and engage over the base flanges or webs of the angle bars and permit movement of the angle bars as is required in regulating the tension on the absorbent strips.

It will be understood that when an animal approaches the feeder, assuming that the feeder has been appropriately vertically adjusted, the back of the animal will pass under the oiler and slightly raise the same and the burlap strips will bear directly on the animal's back and, hence, will apply oil thereto so that the animal will be thoroughly oiled.

While I have herewith shown and described a preferred embodiment of my invention, I would have it understood that changes may be made in the form, proportion and construction of the several parts, without departing from the spirit of my invention, and within the scope of the appended claims.

Having thus described my invention, I claim:—

1. In combination with a feeder, arms at the ends of the feeder, pivotally mounted thereon and projecting from one side thereof, an oiler arranged in front of the feeder and supported on said arms, and means to support said arms and oiler at any desired vertical adjustment thereof.

2. An oiler having a longitudinal opening between its side walls, angle bars on opposite sides of the lower portions of the side walls, an absorbent material in said opening and between the lower portions of the side walls, bolts extending through said angle bars, side walls and absorbent material and putting the absorbent material under compression, and supporting means on which said angle bars bear.

In testimony whereof I affix my signature.

HERMAN J. SCHIPPER.